M. M. CHERRY
HAY-FORK.
No. 169,417. Patented Nov. 2, 1875.
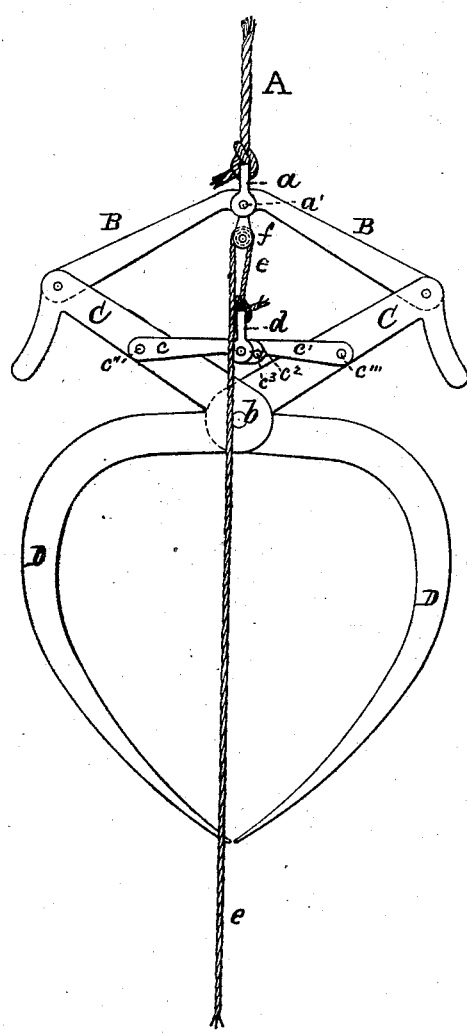
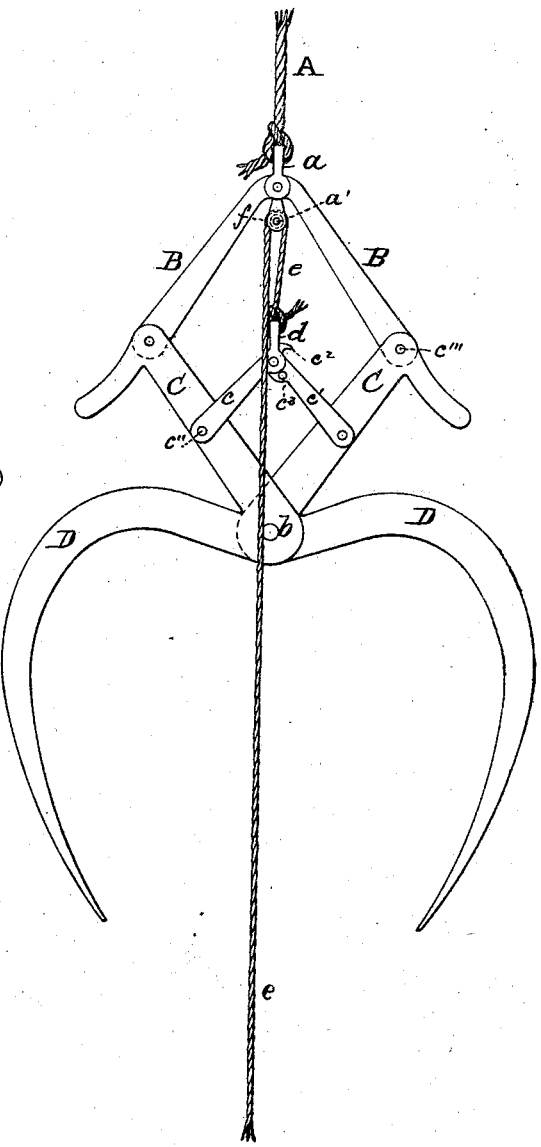
WITNESSES.
INVENTOR.
Moses M. Cherry
by A. W. J. Howard, atty.

UNITED STATES PATENT OFFICE.

MOSES M. CHERRY, OF NEW PLYMOUTH, OHIO, ASSIGNOR OF ONE-HALF HIS RIGHT TO SAMUEL CHERRY.

IMPROVEMENT IN HAY-FORKS.

Specification forming part of Letters Patent No. 169,417, dated November 2, 1875; application filed August 19, 1875.

*To all whom it may concern:*

Be it known that I, MOSES M. CHERRY, of New Plymouth, Vinton county, Ohio, have invented certain Improvements in Hay-Forks, of which the following is a specification, reference being had to the accompanying drawing, forming a part hereof.

This invention relates to that class of hay-forks which are used in hoisting the hay, and in the drawing referred to is shown in Figure 1 closed, and in Fig. 2 open.

A is the hoisting-rope, connecting to a suspending-shackle, $a$, which is placed at the union of the two rods B. The rods B are pivoted to the outwardly-projecting arms C of the fork, the tines of which are shown by D. The tines are pinned or bolted together at $b$ in a manner admitting of a free movement at the joint. The tines D are curved, and of a length adapting them to close upon the hay and lift a considerable quantity. The arms C are further coupled together by a knuckle-joint, consisting of the rods $c\ c'$, which are secured loosely to the said arms by pins $c''\ c'''$. The rods $c\ c'$ are held together at their point of union by a loose pin, and provided with a shackle, $d$, to which a cord, $e$, is secured, which passes over the small pulley $f$, suspended from the pin $a'$. The rod $c$ is provided with a hook, $c^2$, which fits, when the parts of the fork are placed as shown in Fig. 1, over or rests upon a small pin, $c^3$, projecting from the rod $c'$. When hay is to be loaded, stored, &c., the fork is suspended from the elevator employed, which may be automatic or otherwise, and pulled down by means of the cord $e$, which act causes the tines D to open. The fork having descended, the pull upon the cord $e$ is released, and the tines close by their own weight upon and grapple the hay, the knuckle-joint closing and locking, as shown in Fig. 1. The fork is then allowed to ascend, and when the proper height is reached the cord $e$ is pulled, and the tines thereby opened, when the hay falls to the place to which it has been elevated. The fork is then ready to be pulled down again by means of the cord $e$.

Having described my invention, I claim as new and wish to secure by Letters Patent of the United States—

The tines D, pivoted at $b$, and having the outward-flaring arms $c$, the knuckle-joints $c\ c'$, provided with the shackle $d$ and hook and pin $c^2\ c^3$, and rods B, having the shackle $a$ and pulley $f$, all combined with the ropes A and $e$, substantially as and for the purposes specified.

In testimony whereof I have hereunto subscribed my name this 12th day of July, in the year of our Lord 1875.

MOSES M. CHERRY.

Witnesses:
 L. C. GIBBONS,
 T. M. CHERRY.